No. 894,664. PATENTED JULY 28, 1908.
E. KIMBER.
CHECK.
APPLICATION FILED MAR. 26, 1906.
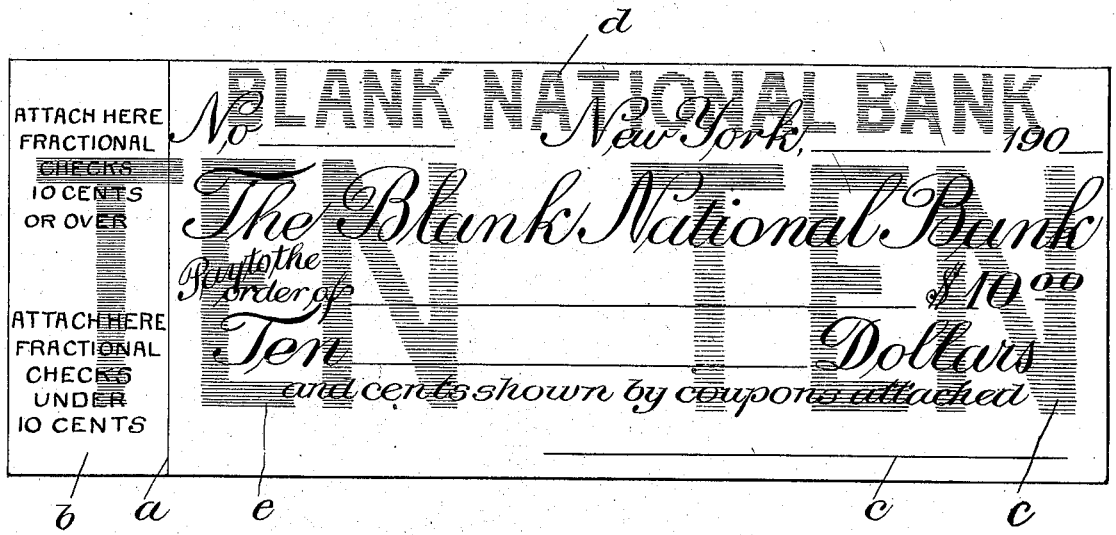

UNITED STATES PATENT OFFICE.

EMMOR KIMBER, OF DORCHESTER, MASSACHUSETTS.

CHECK.

No. 894,664.

Specification of Letters Patent.

Patented July 28, 1908.

Application filed March 26, 1906. Serial No. 308,108.

*To all whom it may concern:*

Be it known that I, EMMOR KIMBER, a citizen of the United States, residing at Dorchester, in the county of Suffolk and State of Massachusetts, have invented certain new and useful Improvements in Checks; and I do hereby declare the following to be a full, clear, and exact description of the invention, such as will enable others skilled in the art to which it appertains to make and use the same.

My invention relates to improvements in checks, and the object of my invention is to provide a check which shall be secure against alteration, and in which the total amount of the check will be shown by the water marks in the paper itself.

In the accompanying drawings; Figure 1 is a view of the face of the check, and Fig. 2 is a face view of a sheet of stamps or coupons adapted to be attached thereto.

The check is made of tinted paper, of such a character that the action of alkalies thereon will destroy the tint, and the printing on the face of the check is done with ink sensitive to acids. The usual way of altering a check is to take out the ink marks by means of an acid or an alkali, to then restore the paper to its original condition by the use of an alkali or an acid, and then write in the desired amount. This cannot be done with a check made according to my invention without detection, because the tint of the check is sensitive to an alkali, and the ink thereon sensitive to an acid. After the ink has been taken out by an acid the application of an alkali to get rid of the effects of the acid and restore the paper to its original condition will destroy the tint of the paper, thus rendering detection easy.

Of course, the materials used may be reversed and the check may be tinted with a substance sensitive to an acid, and the printing done with an ink sensitive to an alkali.

Referring to the drawings, the check is in the main of the ordinary type, bearing at the top a blank number and date and the place of issuance and in the center the name of the bank on which the check is drawn, together with an order for the payment of money and the amount of money.

On the left the check has an extension separated therefrom by a line $a$ leaving a space $b$, on the upper part of which space is printed the words "Attach here fractional checks 10 cents or over", and near the bottom of the space $b$ are the words "Attach here fractional checks under 10 cents".

The check is provided with a blank space $c$ for the signature. The check is also water marked as follows. Preferably arranged near the top of the check is a water mark $d$ giving the name of the bank by which the check is made, and on the body of the check is a water mark, such as $e$, giving the amount in dollars for which the check is made. The paper on which the checks are printed, is made, of course, in long strips, and the water marks are of such a size and placed in such a position that each check will contain a complete water mark showing the number of dollars for which the check is made.

In Fig. 2 is shown a sheet of stamps or coupons $f$ separated from each other by a series of perforations $g$, so that they may be readily detached from each other. This sheet is provided with means for attaching the coupons to the main check, preferably by means of an adhesive substance placed upon the back of the sheet of coupons, but any desired method and means of attaching the coupons to the check proper may be used.

Each of the coupons or stamps has printed upon it its value, as shown at $h$, these values running from 10 cents to 90 cents, and from 1 cent to 9 cents. Furthermore, each of the stamps has a water mark upon it, such as $i$, giving the exact value of the stamp or coupon. These sheets of coupons are made of tinted paper sensitive to the action of an alkali or an acid, and the printing thereon is done with ink sensitive to an acid or an alkali, as already described in connection with the check proper.

It results from the construction described that a check will be produced which cannot be altered without detection, and in which the entire amount of the check, both in dollars and cents will be shown in two ways;
first by the printing or writing thereon, and second by the water marks on the paper.

Unlike the ordinary check, these checks are made in fixed amounts, one dollar, two dollars, five dollars, ten dollars, twenty dollars, and so on, and if it is desired to increase the amount of the check for convenience in business, this is done by using the coupons and attaching them to the main check.

Having thus described my invention, what I claim as new and desire to secure by Letters Patent is:—

1. A check having water marks thereon indicating a specific sum in dollars, with coupons attached thereto having thereon indications of their face value, said coupons being each water marked so that the entire amount of the check, with coupons attached, in dollars and cents, will be shown by the water marks on the checks and coupons, said check having a tinted body and having printing thereon, the one being sensitive to an acid and the other to an alkali, substantially as described.

2. A check having water marked thereon the name of the bank on which it is drawn, and having also water marked thereon the exact sum in dollars for which the check is made, combined with coupons each having water marked thereon a specific value, and having means for attaching them to the check proper, said check having a tinted body and having printing thereon, the one being sensitive to an acid and the other to an alkali, substantially as described.

3. A check composed of tinted paper sensitive to an alkali and having water marked thereon the name of the bank on which it is drawn, and also having a water mark thereon designating the exact amount in dollars of the check, said check having writing or printing thereon made with an ink sensitive to acids, and a series of coupons each having a specific face value, and having means for attaching them to the check proper, each of said coupons bearing thereon a water mark denoting its value in cents, substantially as described.

In testimony whereof, I affix my signature, in presence of two witnesses.

EMMOR KIMBER.

Witnesses:
A. L. HOUGH,
W. MAX. DUVALL.